United States Patent
Lichtenstadt et al.

(10) Patent No.: US 8,683,220 B2
(45) Date of Patent: Mar. 25, 2014

(54) SYSTEM AND METHOD FOR SECURING DATABASE ACTIVITY

(75) Inventors: Aviad Lichtenstadt, Tel Aviv (IL); Guy Lichtman, Hertzliya (IL); Slavik Markovich, Los Altos, CA (US)

(73) Assignee: McAfee, Inc., Santa Clara, CA (US)

( * ) Notice: Subject to any disclaimer, the term of this patent is extended or adjusted under 35 U.S.C. 154(b) by 6 days.

(21) Appl. No.: 13/248,121

(22) Filed: Sep. 29, 2011

(65) Prior Publication Data

US 2013/0246796 A1    Sep. 19, 2013

(51) Int. Cl.
*G06F 21/00* (2013.01)
(52) U.S. Cl.
USPC ........................................... 713/189
(58) Field of Classification Search
USPC ................ 713/176, 180, 187, 189; 726/22, 26
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,272,639 B1 * | 9/2007 | Levergood et al. | 709/218 |
| 7,506,155 B1 | 3/2009 | Stewart et al. | |
| 2009/0199285 A1 * | 8/2009 | Agarwal et al. | 726/9 |

OTHER PUBLICATIONS

McAfee Database Activity Monitoring, Data Sheet, copyright 2010 McAfee, Inc., retrieved and printed on Sep. 19, 2011 from website http://www.mcafee.com/us/resources/data-sheets/ds-database-activity-monitoring.pdf (2 pages).
Understanding and Selecting a Database Activity Monitoring Solution by Rich Mogull, Sans Institute, retrieved and printed on Sep. 19, 2011 from website http://securosis.com/reports/DAM-Whitepaper-final.pdf (23 pages).
Sentrigo Hedgehog Enterprise Review by Pete Finnigan, copyright PeteFinnigan.com Limited 2010, retrieved and printed on Sep. 19, 2011 from website http://www.petefinnigan.com/Sentrigo_HedgeHog_Enterprise.pdf (28 pages).
The Future of Database Activity Monitoring, Gartner RAS Core Research Note G00201585, Jeffrey Wheatman, Jun. 22, 2010, retrieved and printed on Sep. 19, 2011 from website ftp://ps.boulder.ibm.com/software/data/guardium/gartner_report_march2011_future_database_act_monitor.pdf (4 pages).

* cited by examiner

*Primary Examiner* — Ellen Tran
(74) *Attorney, Agent, or Firm* — Patent Capital Group (57) ABSTRACT

A method is provided in one example embodiment that includes detecting database activity associated with a statement having a signature, validating the signature; and evaluating the statement as a signed statement if the signature is valid. In more particular embodiments, the signature may include a unique script identifier and a hash function of a shared key. In yet other embodiments, validating the signature may include checking a session variable and comparing the statement to a list of signed statements.

20 Claims, 4 Drawing Sheets

SYSTEM AND METHOD FOR SECURING DATABASE ACTIVITY

TECHNICAL FIELD

This specification relates in general to information systems, and more particularly, to a system and method for securing database activity.

BACKGROUND

Databases and their database management system (DBMS) counterparts have evolved to facilitate designing, building, and maintaining complex information systems, but databases and DBMSs themselves have also evolved into quite complex systems. The size, capabilities, and performance of databases and DBMSs have grown by orders of magnitude along with the progress of technology in the areas of processors, computer memory, computer storage, and computer networks.

Databases often contain sensitive data, which usually resides within tables that can be used by various applications. Many types of controls can be implemented to protect databases (and the sensitive data within them). For example, network security measures may be used to guard against unauthorized external access, while database activity monitoring tools can be used to audit internal activity and guard against authorized access for unauthorized purposes. However, these controls may not be able to differentiate adequately between authorized and unauthorized access to sensitive data by an authorized user. A manual investigation is often necessary to determine if many activities are approved. Thus, significant challenges remain for designing and implementing systems and methods for securing database activity.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes detecting database activity associated with a statement having a signature, validating the signature; and evaluating the statement as a signed statement if the signature is valid. In more particular embodiments, the signature may include a unique script identifier and a hash function of a shared key. In yet other embodiments, validating the signature may include checking a session variable and comparing the statement to a list of signed statements.

Example Embodiments

Figure 1:
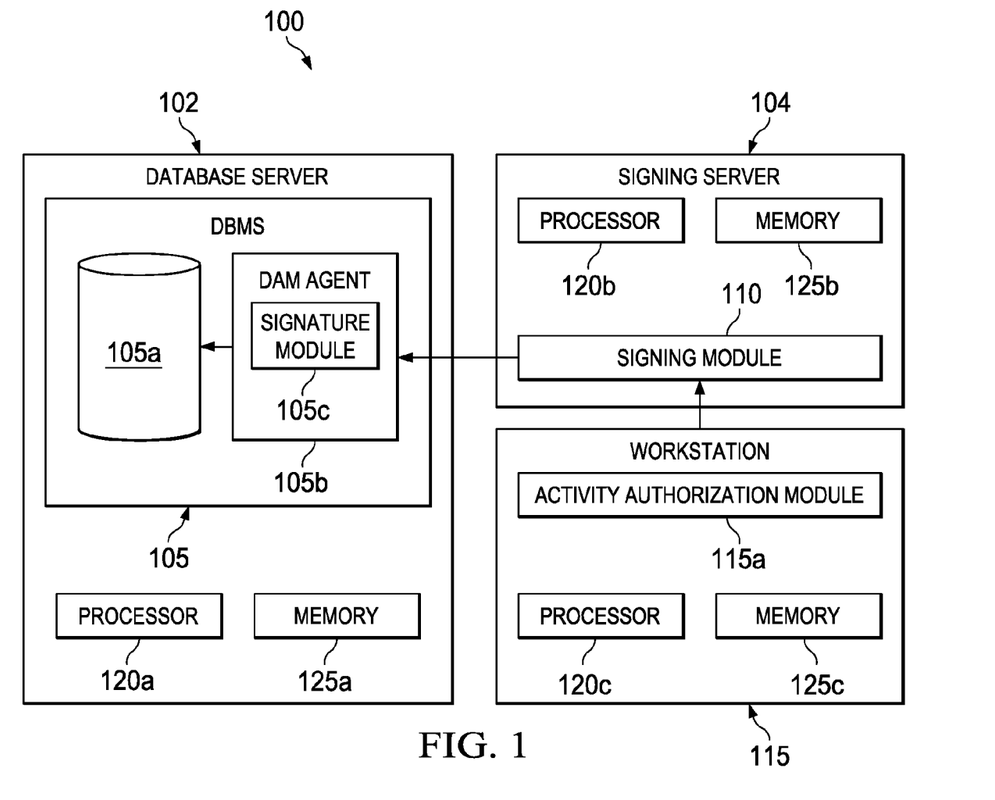
FIG. 1 is a simplified block diagram illustrating an example embodiment of a database system for securing database activity in accordance with this specification.

Turning to FIG. 1, FIG. 1 is a simplified block diagram of an example embodiment of a database system 100 for securing database activity in accordance with this specification. Database system 100 generally includes a database server 102, which may have a database management system (DBMS) 105. Database server 102 may be connected to a signing server 104, which may include a signing module 110. A workstation 115 may include an activity authorization module 115a, and may be connected to signing server 104 and/or database server 102. DBMS 105 is a system (typically a software system) for controlling the creation, maintenance, and use of a database 105a. Database 105a may be logically connected to a database activity monitor (DAM) 105b, which may incorporate a signature module 105c. DAM 105b may, in turn, be logically connected to signing module 110.

Each of the elements of FIG. 1 may couple to one another through simple network interfaces or through any other suitable connection (wired or wireless), which provides a viable pathway for network communications. Additionally, any one or more of these elements may be combined or removed from the architecture based on particular configuration needs. Database system 100 may include a configuration capable of transmission control protocol/Internet protocol (TCP/IP) communications for the transmission or reception of packets in a network. Database system 100 may also operate in conjunction with a user datagram protocol/IP (UDP/IP) or any other suitable protocol where appropriate and based on particular needs.

Before detailing the operations and the infrastructure of database system 100, certain contextual information is provided to offer an overview of some problems that may be encountered while implementing a planned activity within a DBMS. Such information is offered earnestly and for teaching purposes only and, therefore, should not be construed in any way to limit the broad applications of the present disclosure.

Many organizations strictly control activity on a production database, which in general may include any operation that retrieves or modifies data, schema, or permissions of the database. Organizations may be particularly sensitive to activity that modifies or accesses application level data. A database administrator (DBA) typically manages a DBMS and usually has access to sensitive data within a database, which can reside within tables used by various applications, for example. A DBA may require access to application data to perform maintenance on the database, for example. Such maintenance may include, data modification, schema modification, user permission modifications, etc. DAM tools may be used to audit a DBA's activity, which is often required to comply with policies and regulations. The basic function of audit tools is to ensure that a DBA does not access sensitive data in an unauthorized manner or for an unauthorized purpose.

A DAM may also alert security staff if activity violates a policy or indicates anomalous behavior, for example, such as modifying or accessing application level data. Modifying an application table is considered a security event by many organizations, and thus a DAM would alert appropriate security staff upon detection of such activity. The security staff generally must review and investigate each such alert.

A DAM, though, is generally unable to differentiate between an authorized and unauthorized modification to sensitive data, since the DBMS, via internal permission mechanisms, may view the activity as valid. For example, a database administrator may routinely need access to sensitive data for maintenance purposes and, consequently, a database activity monitor may not be able to determine if such an administrator is accessing sensitive data for an unauthorized purpose. Thus, activity by a DBA, such as access to sensitive data, may require a manual investigation by security staff to determine if the activity is authorized or unauthorized. In this context, "authorized" activity includes activity by an authorized user for an authorized purpose (e.g., part of an approved maintenance procedure). In contrast, "unauthorized" activity includes activity by an authorized user for an unauthorized purpose (e.g., a DBA modifying application data without authorization from the application owner).

In one example scenario, an approved application change may require modifying application tables on a production DBMS. A developer or application owner can submit a script (i.e., a list of queries, commands, statements, etc.) for the change to a DBA. The DBA can review the script and execute it on the production database, but a DAM may generate a security alert that requires security staff to review the activity manually, since the DBA is attempting to modify and/or access application data. Thus, security staff could contact the DBA to inquire about the script. The DBA could then indicate that the script is part of an approved application modification and direct the security team to the developer or application owner for verification. The security team could then contact the developer or application owner and verify authorization. However, a manual investigation of every change (both approved and unapproved) by a DBA can create significant overhead for security staff.

In accordance with embodiments disclosed herein, database system 100 can overcome such shortcomings (and others) by providing a system and method for differentiating between authorized and unauthorized activity. In more particular embodiments, for example, database system 100 may provide a process of securely signing a script containing authorized activity (e.g., accessing or modifying tables having sensitive data). Signed content may be identified and validated by a DAM, without any modification to a DBMS and without the need to alert security staff for an investigation.

Thus, in certain embodiments, a planned activity on a DBMS may be pre-approved by securely signing statements. A "statement" in this context generally includes any command, query, code, or other form of instruction associated with implementing a database activity. For example, planned activity may be specified in a script file via Structured Query Language (SQL) statements or other database programming statements in languages such as Procedural Language/SQL (PL/SQL) or Transact-SQL (T-SQL). The script file may be analyzed and modified to include a secure signature, which generally includes any data attached to or associated with a statement or script that verifies the origin, integrity, and/or authorization of the statement or script. A DAM can analyze a script to identify such a signature and associate it with statements in the script. Through such an association, authorized activity can be distinguished from unauthorized activity, and specific rules may be defined to handle each.

Turning to the infrastructure of the example embodiment of database system 100 in FIG. 1, database 105a is representative of any collection of data organized for ease and speed of search and retrieval, particularly data organized into data structures (e.g., fields, records, objects, etc.) according to data models such as a relational model, an entity-relationship model, or an object model. Database 105a may include, for example, a collection of records, files, and other objects. DBMS 105 is representative of any system that can facilitate the creation, maintenance, or use of database 105a. DBMS 105 can also provide facilities for enforcing data integrity, managing concurrency control, recovering the database after failures and restoring it from backup files, as well as maintaining database security. Moreover, DBMS 105 can allow different programs to concurrently access the same database and typically supports high-level programming languages such as SQL for describing, manipulating, and querying data in a database.

DAM 105b generally operates independently of DBMS 105, but can monitor and analyze database activity for activity that violates security policy or indicates behavior anomalies. More particularly, DAM 105b may provide real-time monitoring, such as by analyzing protocol traffic (e.g., SQL) over the network, or by observing activity on DBMS 105, or both. Agents or native logging may be used to capture activities executed on DBMS 105. An agent can capture desired information, but cannot be disabled by a DBA, who may have the ability to disable or modify native audit logs. DAM 105b can analyze activity to identify known exploits or policy breaches, or can capture baseline activity over time to build a normal pattern used for detection of anomalous activity that could be indicative of intrusion.

In general, signing server 104 represents any type of node in database system 100 that can establish a connection with a DBMS or DAM agent, such as DBMS 105 or DAM 105b. Signing server 104 may be collocated with database server 102 on a single machine, or may be located on a separate machine, including but not limited to a server, desktop computer, laptop computer, or other network element, connected to database server 102 over a network connection, for example.

Workstation 115 represents any node, terminal or network element that can connect directly or indirectly to a signing server (e.g., signing server 104) and allow an authorized user (e.g., an application owner) to load and sign a script or other file on the signing server. Workstation 115 may include, for example, a desktop computer, a laptop computer, tablet computer, or a telecommunications device (e.g., an iPhone, Android device, etc.).

In regards to the internal structure associated with database system 100, each of database server 102, signing server 104, and workstation 115 can be implemented in machines that include a respective processor 120a-120c that can execute software or an algorithm to perform activities described herein, and a respective memory element 125a-125c that may store information to be used in the operations outlined herein.

These devices may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein should be construed as being encompassed within the broad term "memory element." The information being tracked or sent by database server 102, signing server 104, or workstation 115 could be provided in any database, register, control list, or storage structure, all of which can be referenced at any suitable timeframe. Any such storage options may be included within the broad term 'memory element' as used herein.

In one example implementation, database server 102, signing server 104, or workstation 115 may include software to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements (as shown in FIG. 1) can store data used for the operations described herein. This includes the memory elements being able to store software, logic, code, or processor instructions that are executed to carry out the activities described herein.

A processor can execute any type of instructions associated with the data to achieve the operations detailed herein. In one example, the processors (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor." Each of the network elements can also include suitable interfaces for receiving, transmitting, and/or otherwise communicating data or information in a network environment.

Figure 2:
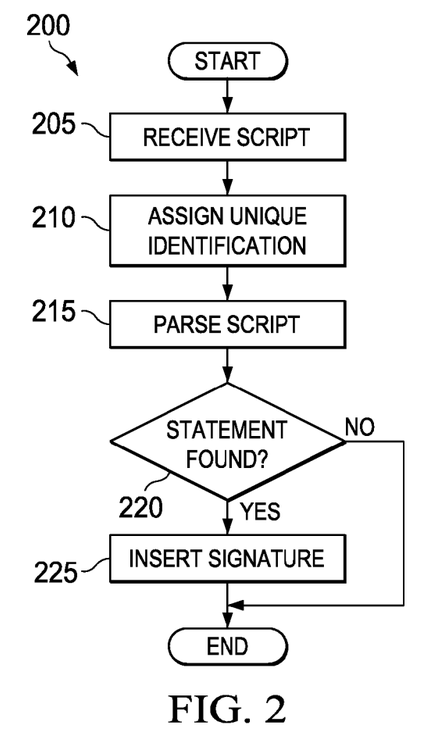
FIG. 2 is a simplified flowchart illustrating potential operations for signing a script that may be associated with the database system, in which a shared secret may be used to secure the signature.

FIG. 2 is a simplified flowchart 200 illustrating potential operations for signing a script that may be associated with particular embodiments of database system 100, in which a shared secret may be used to secure the signature. In certain embodiments, such operations may be executed by signing module 110, and as a preliminary matter, a secret key (i.e., a piece of information or a parameter that determines the functional output of a cryptographic algorithm or cipher) may be shared between signing module 110 and DAM 105b.

A script containing statements for executing authorized database activity may be received at 205. For example, an application developer may author such a script and load the script in signing server 104 with activity authorization module 115a. A unique script identifier may be generated and associated with the script at 210, such as by storing the identifier and a filename of the script in a table, for example. At 215, the script may be parsed to identify statements within the script. For example, a script containing SQL statements may be parsed according to SQL syntax and vendor-specific extensions. For each statement identified at 220 while parsing the script, a signature may be inserted at 225.

In one particular embodiment, a signature may be embedded in a comment prepended to each statement. The signature may include, for example, a signature token, the script identifier, metadata, and a signature hash. In such an embodiment, the signature token may be any string or flag, for example, that allows a signed statement to be distinguished from an unsigned (i.e., unauthorized) statement. The string may be arbitrary (e.g., "asdf") or a recognizable word or words (e.g., "SECURE SCRIPT"). Metadata may include additional information about a script, such as valid run times, the target DBMS system, authorized user, etc. A signature hash may, for example, be based on a one-way hash function (e.g., SHA256) applied to the statement, the shared key, the script identifier, the metadata, or any combination thereof.

Thus, to further illustrate one embodiment with an example, a statement such as "select * from accounts" may be signed by changing it to "/*SECURE SCRIPT:<script-id>, <metadata>, hash(<shared secret>, <statement>, <script-id>, <metadata>) */select * from accounts," where "/*" indicates the beginning of an embedded comment, <script-id> represents the unique script identifier, <metadata> represents the metadata, <shared secret> represent the secret key exchanged between a signing server and a DAM, and <statement> represents the original statement (i.e., "select * from accounts"). Additionally, a list, table, or other suitable storage structure containing script identifiers of revoked scripts may be maintained by a signing server and a DAM, for example. Thus, if a script is revoked, a signing server may send the script identifier associated with the revoked script to a DAM, which can block execution of any script attempting execute with that script identifier.

Figure 3:
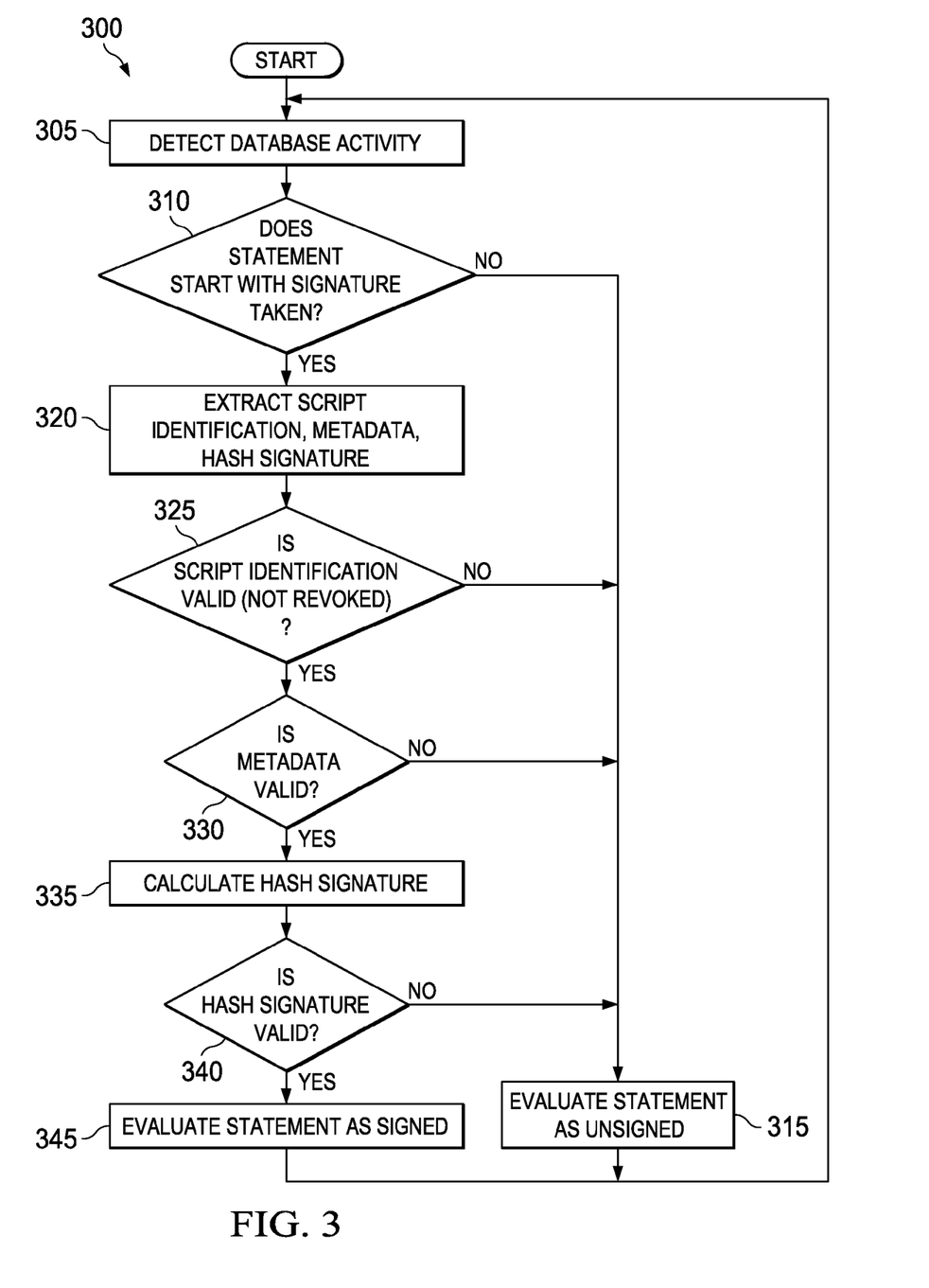
FIG. 3 is a simplified flowchart illustrating potential operations that may be associated with database activity monitoring in the database system, in which a shared secret may be used to secure the signature.

FIG. 3 is a simplified flowchart 300 illustrating potential operations that may be associated with database activity monitoring in particular embodiments of database system 100, in which a shared secret may be used to secure the signature. In certain embodiments, such operations may be carried out by DAM 105b and signature module 105c, for example.

Database activity, such as attempting to execute statements in a script, may be detected at 305. At 310, each statement may be parsed to determine if the statement includes a signature token (e.g., "SECURE SCRIPT") indicative of a signed statement. If no signature token is found in a statement, the statement can be evaluated as unsigned at 315 (e.g., allowed to execute with an alert). If a signature token is found, then the signature (e.g., a script identifier, metadata, and signature hash) may be extracted at 320. The signature may be validated, for example, by validating components of the signature. Thus, for example, the script identifier may be validated at 325, such as by comparing it with a list of revoked script identifiers. If the script identifier is not valid (e.g., revoked), the statement may be evaluated as unsigned at 315. If the script identifier is valid, the metadata may be examined at 330 for limitations or conditions for statement execution. For example, the metadata may include permissible times during which the statement may execute. If the metadata prohibits execution, the statement may be evaluated as unsigned at 315. If the metadata does not prohibit or limit execution, a signature hash may be calculated at 335 using the same hash function and same parameters used to sign the original statement (e.g., at 225 in FIG. 2). For example, a SHA256 function may be applied to the statement, the shared key, the script identifier, and the metadata. The signature may be validated by comparing the calculated signature hash to the extracted signature hash (i.e., the hash value extracted from the statement) at 340. If the calculated hash and the extracted hash do not match at 340, then the statement may be evaluated as unsigned at 315. If the calculated hash and the extracted hash match at 340, then the statement may be evaluated at 345 as a signed statement (e.g., allowing the statement to execute without an alert).

Figure 4:
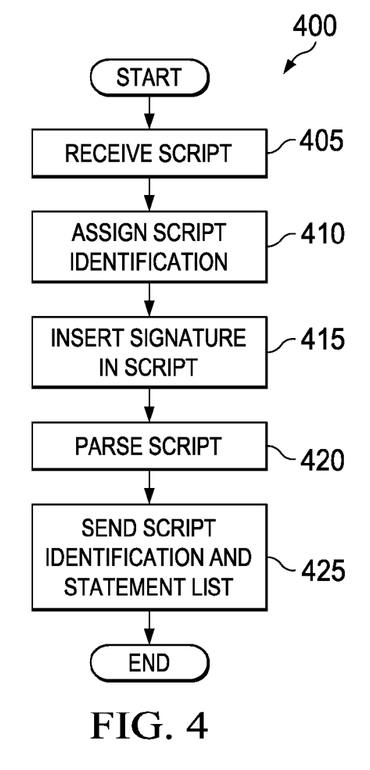
FIG. 4 is a simplified flowchart illustrating potential operations that may be associated with the database system, in which a script identifier and a valid statement list may be used to securely sign a script.

FIG. 4 is a simplified flowchart 400 illustrating potential operations that may be associated with particular embodiments of database system 100, in which a script identifier and a valid statement list may be used to securely sign a script. A script containing statements for executing authorized database activity may be received at 405. For example, an application developer may author such a script and load the script in signing server 104 with activity authorization module 115a.

A unique script identifier may be generated and associated with the script at 410, such as by storing the identifier and a filename of the script in a table, for example. A signature may be inserted into the script at 415. In one particular embodiment, a signature may be embedded in a comment prepended to the script. The signature may include, for example, a signature token and the script identifier, followed by a neutral statement. The signature token may be any string or flag, for example, that allows a signed statement list to be distinguished from an unsigned (i.e., unauthorized) statement list. The string may be arbitrary (e.g., "asdf") or recognizable words (e.g., "START SECURE SCRIPT"). A neutral statement is generally any statement having valid syntax that may execute without accessing or modifying application tables. A second comment and neutral statement may be appended to the script to mark the end of the signed statement list.

Alternatively, the script identifier may be set with a session variable (e.g., context_info in MICROSOFT SQL Server). A statement may be prepended to the script that sets the session variable at the start of the script, and a second statement may be appended to clear the session variable at the end of the script.

Thus, to further illustrate one embodiment with an example, a statement such as "/* START SECURE SCRIPT: <script identifier>*/select 1 from dual" may be prepended to the script to mark the beginning of an authorized statement list, where "select 1 from dual" is an example of a neutral statement. A second statement such as "/* STOP SECURE SCRIPT */select 1 from dual" may be appended to mark the end of the list.

At 420, the script may be parsed to extract each statement and build a statement list. For example, a script containing SQL statements may be parsed according to SQL syntax and vendor-specific extensions to extract each SQL statement in the script. The script identifier, metadata, and statement list may be sent at 425, to DAM 105b, for example. DAM 105b may store the script identifier, metadata, and statement list in a valid statement list data structure, which may map the script identifier to a list of valid statements and any metadata associated with each statement. A script may also be revoked by sending a revoked script identifier to DAM 105b, for example. DAM 105b may remove persisted data associated with the revoked script identifier.

Figure 5:
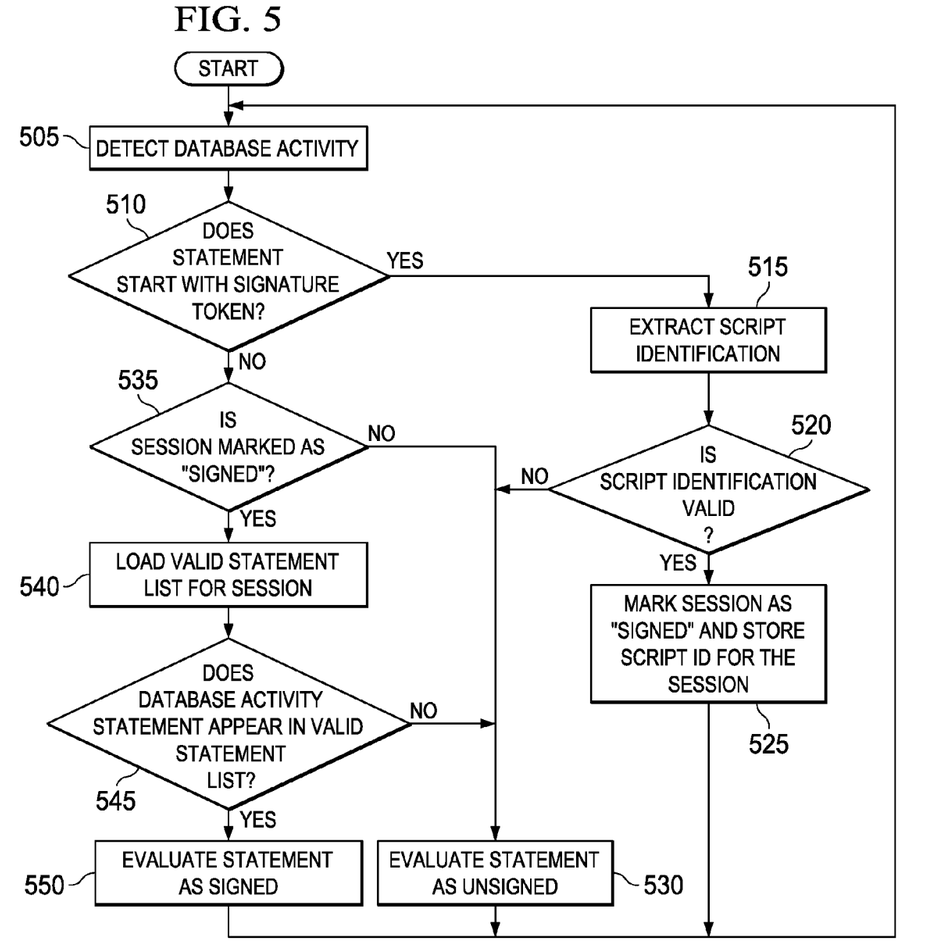
FIG. 5 is a simplified flowchart illustrating potential operations that may be associated with database activity monitoring in the database system, in which a script identifier and a valid statement list may be used to securely sign a script.

FIG. 5 is a simplified flowchart 500 illustrating potential operations that may be associated with database activity monitoring in particular embodiments of database system 100 in which a script identifier and a valid statement list may be used to securely sign a script. In certain embodiments, such operations may be carried out by DAM 105b and signature module 105c, for example.

Database activity, such as executing a statement in a script, may be detected at 505. At 510, the statement may be parsed to determine if the statement includes a signature token (e.g., "START SECURE SCRIPT"). If a signature token is found, a script identifier may be extracted at 515. If the script identifier is determined to be valid (e.g., not revoked) at 520, and at 525 the session may be marked as "signed" (e.g., a session variable set) and the script identifier may be stored for the session. If the script identifier cannot be validated or is determined to be invalid at 520 (e.g., the script identifier is in the revoked script identifier list), the statement may be evaluated as unsigned at 530.

If no signature token is found at 510, a session variable may be checked at 535 to determine if the session is signed. If the session is not signed, the statement may be evaluated as unsigned at 530. If the session is signed, the valid statement list associated with the script identifier for the session may be loaded at 540. At 545, the detected statement may be validated by comparing activity (i.e., the statement) with the valid statement list associated with the script identifier. If the detected statement matches a statement in the valid statement list, the detected statement may be evaluated as signed at 550. If the detected statement does not match a statement in the valid statement list, the detected statement may be evaluated as unsigned at 530.

Thus, database system 100 may provide significant advantages, some of which have already been described. More particularly, database system 100 may substantially reduce or eliminate delays in implementing authorized database activity and significantly decrease overhead for security staff. Database system 100 may distinguish between signed (i.e., authorized) and unsigned scripts, and may treat them differently. The type of alerts generated (if any) may be controlled based on a script's signature (or lack thereof). For example, a signed script may generate informational (audit) alerts that do not require security staff to investigate.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that database system 100 (and its teachings) is readily scalable and can accommodate a large number of components, as well as more complicated/sophisticated arrangements and configurations. Accordingly, the examples provided should not limit the scope or inhibit the broad teachings of database system 100 as potentially applied to a myriad of other architectures. Additionally, although described with reference to particular scenarios, where operations may be associated with a given network element, these operations can be implemented externally, or consolidated and/or combined in any suitable fashion. In certain instances, certain elements may be provided in a single proprietary module, device, unit, etc.

It is also important to note that the steps in the appended diagrams illustrate only some of the possible signaling scenarios and patterns that may be executed by, or within, database system 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by database system 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   detecting database activity by a database activity monitor (DAM) that is collocated with a database server for which it performs monitoring, wherein the database activity includes an attempt to execute a statement in a script, and wherein the statement includes a plurality of instructions for executing the database activity;
   validating a signature by parsing the statement to determine whether the statement includes the signature, wherein an association is generated between the signature and the statement in order to distinguish authorized database activity from unauthorized database activity, and wherein different rules are defined for handling the authorized database activity and the unauthorized database activity; and
   evaluating the statement as a signed statement if the signature is valid, wherein the signed statement is indicative of a planned, preapproved database activity that has been authorized.

2. The method of claim 1, wherein the signature comprises a unique script identifier.

3. The method of claim 1, wherein the signature comprises a hash function of a shared key.

4. The method of claim 1, wherein the signature is embedded in a comment portion of the statement.

5. The method of claim 1, wherein validating the signature comprises extracting a first signature hash from the signature, calculating a second signature hash based on the signature, and comparing the first signature hash to the second signature hash.

6. The method of claim 1, wherein the signature comprises a unique script identifier and validating the signature comprises comparing the statement to valid statements associated with the unique script identifier.

7. The method of claim 1, wherein validating the signature comprises extracting a script identifier from a session variable and comparing the statement to a list of valid statements associated with the script identifier.

8. Logic encoded in one or more non-transitory media that includes code for execution and when executed by one or more processors is operable to perform operations comprising:
   detecting database activity by a database activity monitor (DAM) that is collocated with a database server for which it performs monitoring, wherein the database activity includes an attempt to execute a statement in a script, and wherein the statement includes a plurality of instructions for executing the database activity;
   validating a signature by parsing the statement to determine whether the statement includes the signature, wherein an association is generated between the signature and the statement in order to distinguish authorized database activity from unauthorized database activity, and wherein different rules are defined for handling the authorized database activity and the unauthorized database activity; and
   evaluating the statement as a signed statement if the signature is valid, wherein the signed statement is indicative of a planned, preapproved database activity that has been authorized.

9. The encoded logic of claim 8, wherein the signature comprises a unique script identifier.

10. The encoded logic of claim 8, wherein the signature comprises a hash function of a shared key.

11. The encoded logic of claim 8, wherein the signature is embedded in a comment portion of the statement.

12. The encoded logic of claim 8, wherein validating the signature comprises extracting a first signature hash from the signature, calculating a second signature hash based on the signature, and comparing the first signature hash to the second signature hash.

13. The encoded logic of claim 8, wherein the signature comprises a unique script identifier and validating the signature comprises comparing the statement to valid statements associated with the unique script identifier.

14. The encoded logic of claim 8, wherein validating the signature comprises extracting a script identifier from a session variable and comparing the statement to a list of valid statements associated with the script identifier.

15. An apparatus, comprising:
    a database activity monitor agent;
    a signature module; and
    one or more processors operable to execute instructions associated with the database activity monitor agent and the signature module such that the apparatus is configured for:
    detecting database activity by the database activity monitor agent that is collocated with the apparatus for which it performs monitoring, wherein the database activity includes an attempt to execute a statement in a script, and wherein the statement includes a plurality of instructions for executing the database activity;
    validating a signature by parsing the statement to determine whether the statement includes the signature, wherein an association is generated between the signature and the statement in order to distinguish authorized database activity from unauthorized database activity, and wherein different rules are defined for handling the authorized database activity and the unauthorized database activity; and
    evaluating the statement as a signed statement if the signature is valid, wherein the signed statement is indicative of a planned, preapproved database activity that has been authorized.

16. The apparatus of claim 15, wherein the signature comprises a unique script identifier.

17. The apparatus of claim 15, wherein the signature comprises a hash function of a shared key.

18. The apparatus of claim 15, wherein the signature is embedded in a comment portion of the statement.

19. The apparatus of claim 15, wherein validating the signature comprises extracting a first signature hash from the signature, calculating a second signature hash based on the signature, and comparing the first signature hash to the second signature hash.

20. The apparatus of claim 15, wherein the signature comprises a unique script identifier and validating the signature comprises comparing the statement to valid statements associated with the unique script identifier.

\* \* \* \* \*